United States Patent Office 3,449,677
Patented June 10, 1969

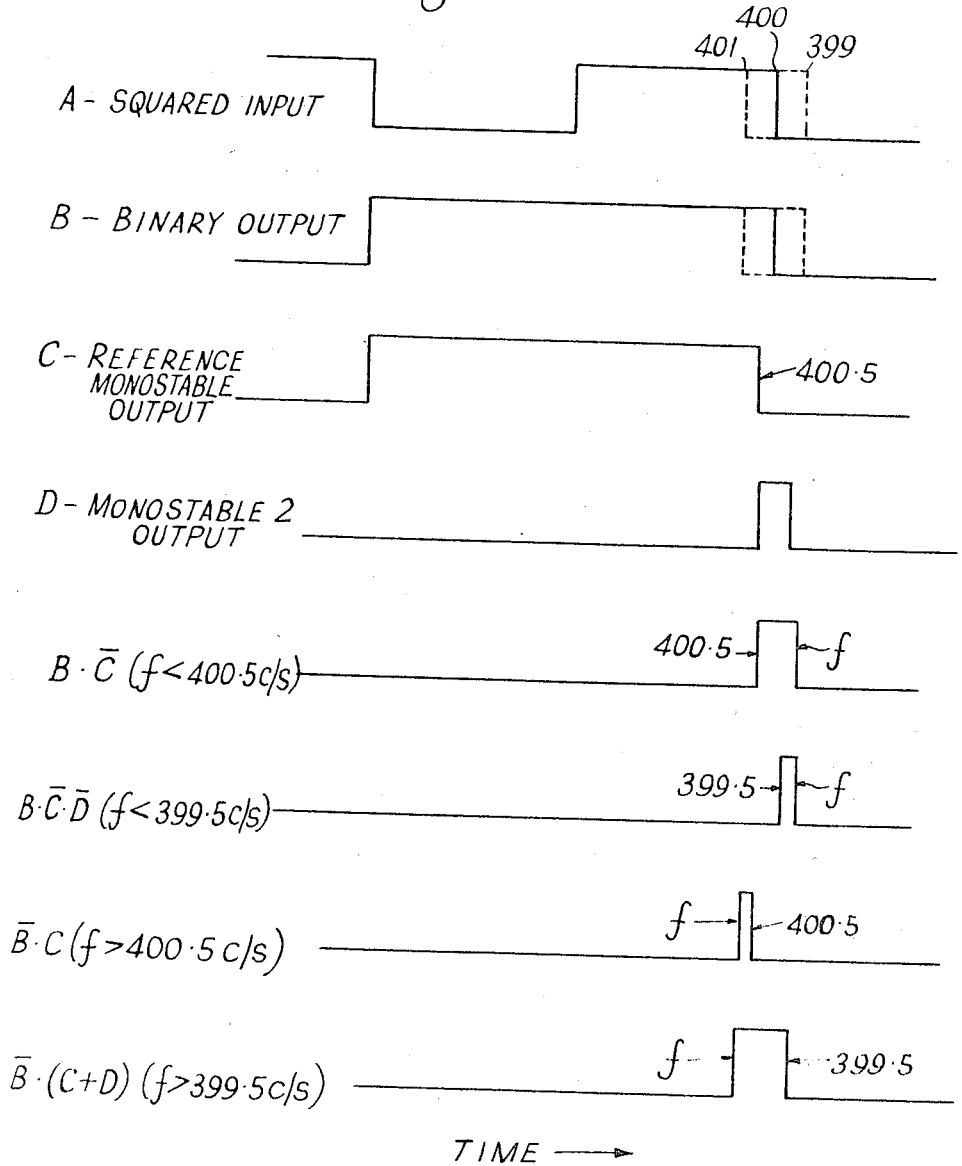

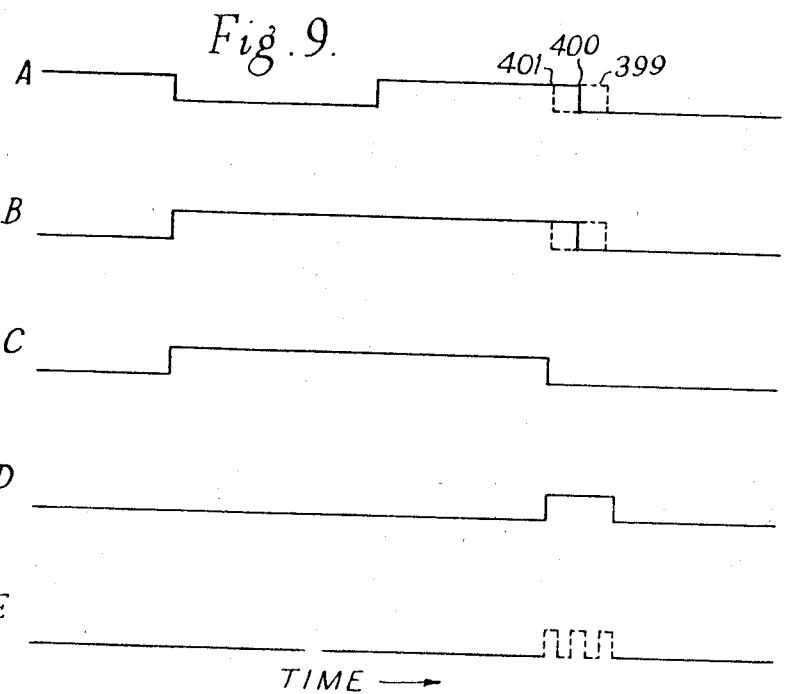
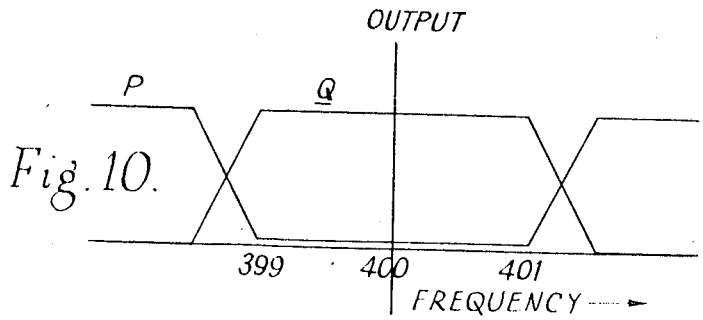

3,449,677
PULSE FREQUENCY DISCRIMINATORS
Anthony Leonard Isaacs, London, and Dennis William Allen, Farnborough, England; said Allen assignor to The Minister of Aviation, in Her Britannic Majesty's Government of the United Kingdom of Great Britain and Northern Ireland, and said Isaacs assignor to Thorn Electronics Limited, London, England
Filed June 1, 1965, Ser. No. 459,996
Claims priority, application Great Britain, June 1, 1964, 22,606/64
Int. Cl. H03b *3/04;* H03d *13/00*
U.S. Cl. 329—50                  8 Claims

ABSTRACT OF THE DISCLOSURE

A frequency discriminator is provided in which an input signal of pulse form is applied to control the generation of a train of reference pulses and these reference pulses are combined in a circuit including AND gates with a square-wave signal having a half-period equal to the period of the input pulses, the resulting output signal being proportional to the difference between the recurrence period of the input pulses and the duration of the reference pulses.

---

The present invention relates to frequency discriminators.

The usual method employed in low frequency discriminators is to pass the signal through frequency-sensitive networks and then to use amplitude or phase detectors to obtain an output whose polarity changes as the signal frequency passes through the centre frequency. Such known devices have the disadvantages that the sensitivity is low and that the centre frequency is often determined by the accurate balancing of two discriminator chains. Long-term stability is then difficult to achieve.

According to the present invention there is provided a discriminator for generating from an input signal in the form of pulses an output voltage or current substantially proportional to the difference between the recurrence period of the said pulses and the recurrence period of a train of reference pulses, said discriminator comprising means for generating under the control of portions of the input signal a reference signal having a substantially rectangular waveform and a period which is either fixed and predetermined or varies only slowly in comparison with the maximum period of the input signal, and means for combining said input signal with said reference signal in such a manner as to derive said output voltage or current.

The input signal may be a signal of other than pulse form. When the input signal is not of substantially rectangular waveform it may be converted into this form by means of a squaring circuit.

The discriminator according to the invention may readily be adapted to have any of a number of different characteristics. For instance the output may be arranged to be zero over a desired range; or the gain of the discriminator may be arranged to be different over different parts of said predetermined range; or the gain may be arranged to become zero and the output constant above and/or below the said predetermined range. Alternatively the discriminator may be arranged to produce an output only in response to an input within or outside of a predetermined frequency band. In this case the device acts as a band-pass or band-stop filter/detector combination. The output may be constant over the pass band (or, as the case may be, outside the stop band).

It may be arranged to control the reference pulse duration in dependence upon the maximum or minimum input signal period. In either case the discriminator may be arranged to accept signals with periods above or below a predetermined value and to reject signals with periods below or above, respectively, the said predetermined value.

The invention will be further described, by way of example, with reference to the accompanying drawings in which:

FIG. 2 shows waveforms occurring at various points in FIG. 1, the waveforms A to D in FIG. 2, occurring at points marked A to D respectively in FIG. 1.

Figure 1:
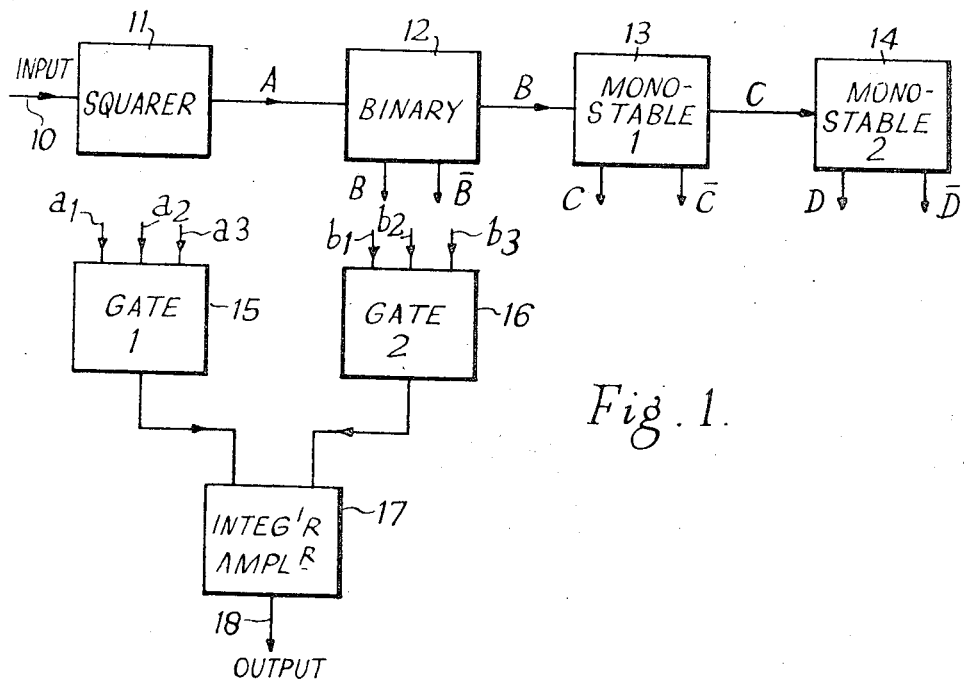
FIG. 1 is a block circuit diagram of one embodiment of the invention.
Figure 3:
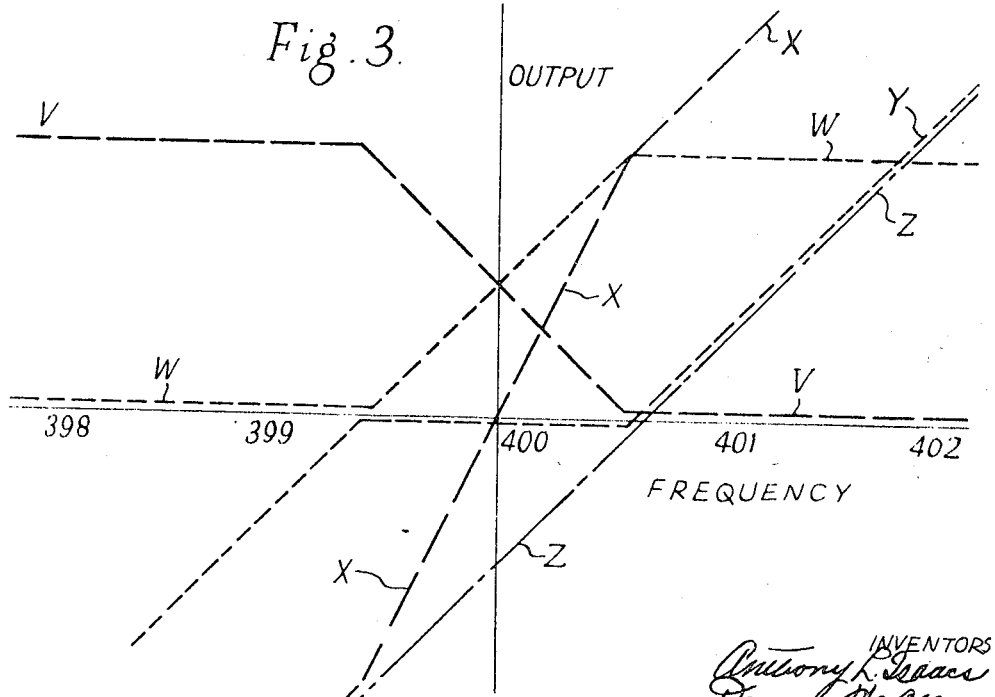
FIG. 3 shows various characteristics of output plotted against frequency that can be obtained with the circuit of FIG. 1, FIGS. 4 and 6 are block circuit diagrams of two further embodiments of the invention.
Figure 4:
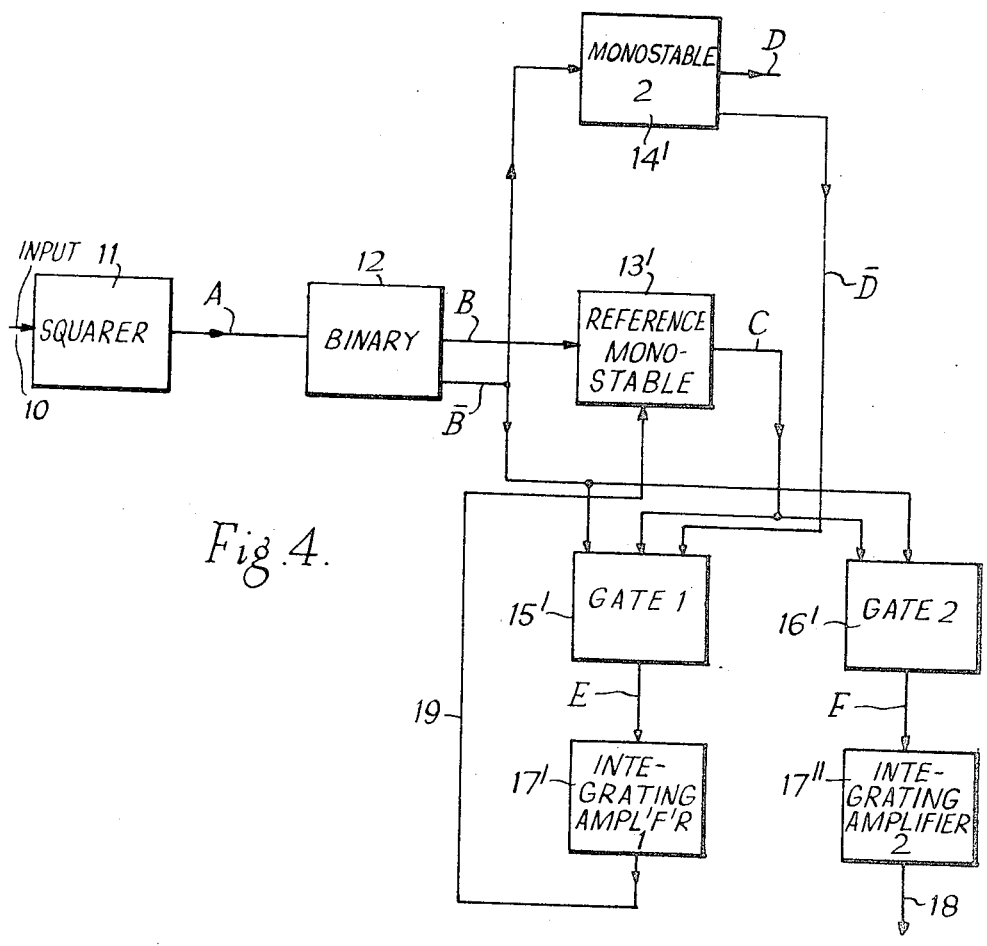
Figure 5:
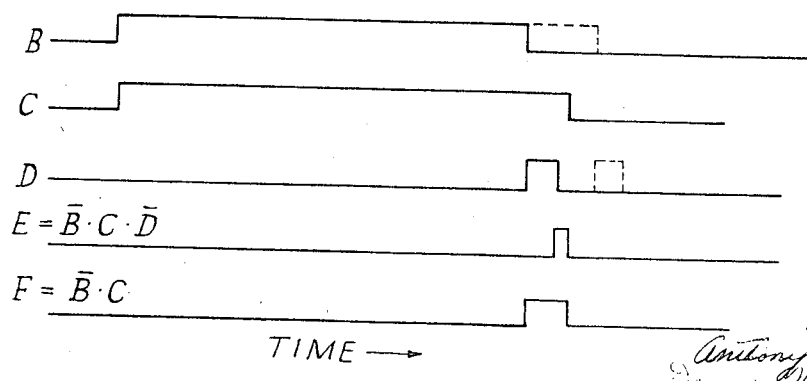
Figure 6:
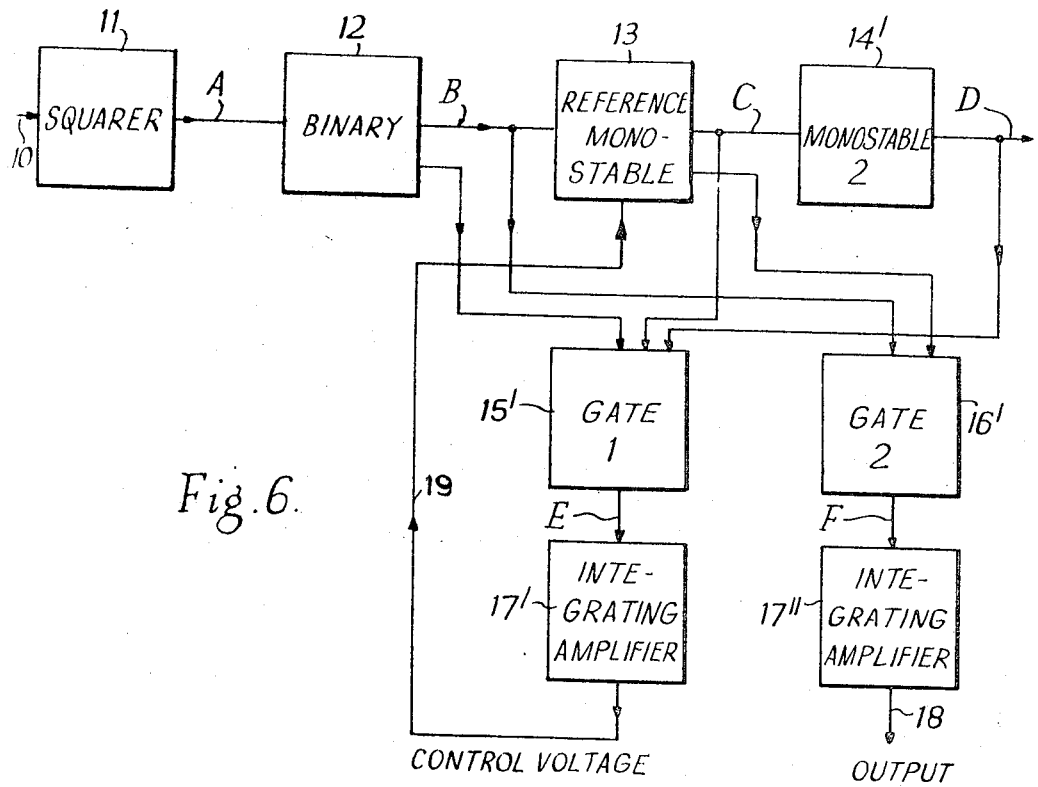
Figure 7:
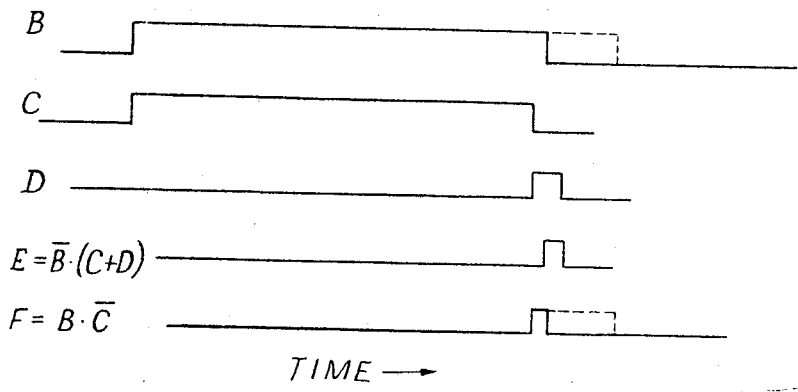
Figure 8:
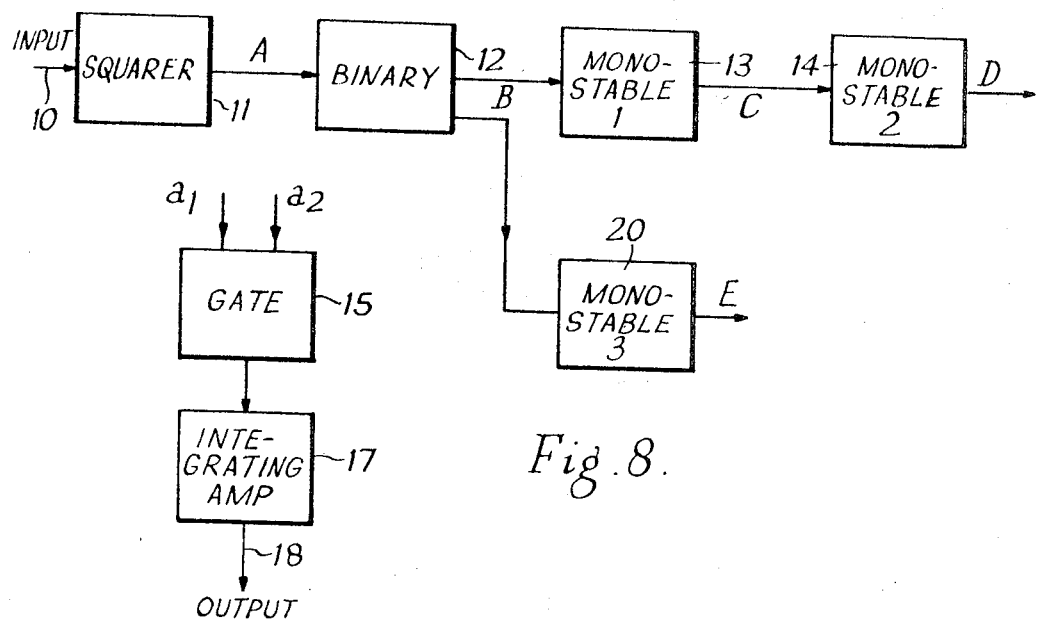

FIGS. 5 and 7 show respectively waveforms occurring at various points in FIGS. 4 and 6 respectively, identified by corresponding letters, and FIGS. 8, 9 and 10 correspond respectively to FIGS. 1, 2 and 3 and illustrate another embodiment of the invention.

It will be assumed that the circuit of FIG. 1 is required to operate with an input signal having a centre frequency of 400 c./s., although, of course, this figure is given only for simplicity of description.

An input signal varying in frequency around 400 c./s. is fed at an input terminal 10 to a squarer 11 which converts the input signal to a rectangular waveform A which is fed to a binary counter (or scale of two counter) 12 which generates a square-wave signal having a "mark" and "space" each of duration equal to the repetition period of the input signal. The effect of the binary counter 12 is to double the period of the waveform A. This binary counter 12 yields two output signals B and $\bar{B}$, the latter being the inverse of B. The waveform B is fed to trigger a first monostable multivibrator 13 yielding output signals C and $\bar{C}$ one of which is the inverse of the other. A second monostable multivibrator 14 is triggered by the waveform C and generates waveforms D and $\bar{D}$.

Suitable pulses derived, as well be described later, from the output terminals of 12, 13 and 14 are applied to the input terminals $a_1$, $a_2$, $a_3$ and $b_1$, $b_2$, $b_3$ of first and second gates 15 and 16. The output signals of the gates are fed to an integrating or low-pass amplifier 17 which combines and integrates the waveforms from the gates to produce the required output voltage at 18.

The waveforms A and B are shown in FIG. 2 in full lines for the centre frequency of 400 c./s. and in dotted lines for the frequencies 399 and 401 c./s. The first monostable 13 is triggered by the leading edges of the waveform B and then generates a pulse C having a duration corresponding to a frequency of 400.5 c./s. The second monostable 14 is triggered by the trailing edge of the waveform C and then generates a pulse of duration equal to the difference between the durations of pulses C (which correspond to 400.5 c./s.) and pulses such as C but pulses C (which correspond to 400.5 c./s.) and pulses such as C but corresponding to 399.5 c./s.

Various response characteristics that may be obtained with the circuit of FIG. 1 are shown in FIG. 3 and are as follows:

V represents an output voltage that varies linearly about the centre frequency over an input frequency range from 399.5 to 400.5 (determined by the width of the pulse D), is constant at a finite positive value at frequencies below 399.5 c./s. and is zero above 400.5 c./s.

W is the complement of V, the output voltage varying linearly but in the opposite sense from 399.5 to 400.5 c./s., being zero below 399.5 and finite and positive above 400.5 c./s.

It may be noted that these characteristics are suitable to provide output voltage or currents for feeding to a two-winding error-reducing torque motor; at the cross-over frequency both output voltages or currents have their mid-value as is necessary with most torque motors. The torque motor can then be arranged to adjust a source of the input signal in such a manner as to tend to maintain the frequency of the source constant.

X shows a high slope (or rate of change) between 399.5 and 400.5 c./s. (the extent of this range being determined by D) and a lower gain above and below these frequencies.

Y shows zero slope from 399.5 to 400.5 c./s. (the bandwidth determined by D) and linear operation above and below this band.

Z is linear throughout and has zero output at 400.5 c./s.

Any of these characteristics can be obtained with the circuit of FIG. 1 by suitably choosing the nature of the gates 15 and 16 and by feeding to the gates inputs such as will yield outputs as given in the following table. In this table the dot and plus sign are recognized abbreviations used in Boolean algebra. The dot represents an AND function and the plus sign signifies an OR function. This is further explained in "Design of Transistorized Circuits for Digital Computers," by Pressman (John F. Ryder), Chapter 2. This type of table is known in the art as a "truth table" and it directs a different set of connections and selection of gates for each desired response. Only five responses are tabulated, but an infinite number is obviously possible.

| Response | Output | |
|---|---|---|
| | Gate 1 | Gate 2 |
| V | — | B.D |
| W | B.D | — |
| X | B.$\bar{C}$ | $\bar{B}$.(C+D) |
| Y | B.$\bar{C}$.$\bar{D}$ | $\bar{B}$.C |
| Z | B.$\bar{C}$ | $\bar{B}$.C |

It will be noted that the second monostable 14 is not required for the response Z.

It will be seen that for the responses V, W, X and Y the centre frequency is determined by the time for which the first monostable 13 is switched on and the frequency range over which there is maximum or zero gain is determined by the time for which the second monostable 14 is switched on.

Over those parts of the characteristics in which there is shown a linear relation between frequency and output, the output is proportional to the time difference between the duration of the input signal A and the period of the reference pulse in waveform C and therefore, for frequency deviations small in relation to the centre frequency, the output is proportional to the frequency deviations.

The pulse duration of the reference monostable 13 may be determined by the values of a single resistor and a single capacitor. The long-term stability can, therefore, readily be made high.

In the embodiment of FIG. 1, the duration of the reference waveform is fixed. It is sometimes required to distinguish between two frequencies that are close together but whose nominal values may vary. An example is two frequencies recorded upon magnetic tape and reproduced at a speed that may vary. Provided that one of the frequencies has a fixed nominal value and is always above or below the other frequency, they can be distinguished by means of the embodiment of the invention shown in FIG. 4 whose waveforms are given in FIG. 5.

It will be assumed that the higher of two frequencies has a fixed nominal value and that this higher frequency has to be distinguished. The squarer 11 and binary 12 perform the same functions as in FIG. 1. The monostable 13' is the same as 13 in FIG. 1 except that its pulse duration is variable by means of a control voltage fed thereto by a lead 19. The second monostable 14' is used to ensure that there is an adequate minimum output from the second gate 16' and also to take part in the generation of the control voltage which controls the duration of the reference pulse. The purpose of this change in reference pulse duration is to ensure that it is always slightly different from the period of the input signal component nearest thereto, thereby reducing the chance of interaction between the output of the binary 12 and the trailing edge of the reference pulse.

The first gate 15' is arranged to produce an output $E=\bar{B}.C.\bar{D}$ when the period of the said input component is less than the duration of the reference pulse. Under these circumstances it is arranged that the voltage from the integrating amplifier 17' fed by the lead 19 to the reference monostable 13' controls this monostable in such a way that the output from the first gate 15' is reduced. The reference monostable 13' is thus arranged to follow slow changes of the input frequency and this enables the second gate 16' to produce an output $F=\bar{B}.C$ only when the input is at the upper frequency.

An alternative arrangement in which the second gate 16' is arranged to respond to the lower frequency is shown in FIG. 6, the corresponding waveforms being shown in FIG. 7. The operation of this circuit will be understood from the description of FIGS. 4 and 5. One application of this circuit is to the measurement of frequency modulation, for example "flutter" in tape recorders, or frequency modulation on the outputs of synchronising pulse generators, or video tape recorders. In this application the reference monostable 13 is controlled by the highest frequency and change of the output of the second gate 16' is proportional to the change of frequency.

The use of the second monostable 14' ensures that there is always a minimum output from the second gate 16', thereby ensuring an output from this gate even for the smallest frequency variation. It has been found in practice that with an input frequency of 10 kc./s. it is possible to detect a frequency modulation of 10 parts per million.

If the second monostable 14' is not used, the output of the second gate 16' is directly proportional to the difference between the pulse duration of the reference monostable 13 (i.e. the minimum period of the input signal) and the period of the input signal, and may give rise to some error for very small deviations due to the finite rise times of the output of the second gate 16'.

The lowest frequency of modulation that can be detected is controlled by the time constant of the first integrating amplifiers 17', and lower deviation frequencies can be detected by monitoring variations of the control voltage. The upper limit of the frequency response is controlled by the input frequency. The repetition rate of the output of the second gate 16' is half the input frequency, and therefore the maximum significant modulation frequency of the output is a quarter of the input frequency.

FIGURES 4 and 6 show circuits which are locked to the maximum frequency and respond to this frequency or the lower frequency respectively. A circuit may be similarly designed to be controlled from the lowest frequency and respond to this frequency or higher frequencies as required.

FIG. 8 is similar to FIG. 1, a third monostable 20 being added and only one gate 1 and integrating amplifier 17 being used. The relevant waveforms are shown in FIG. 9 and in FIG. 10 are shown the responses obtainable. The response P is a band-stop response and Q is a band-pass response. The voltages applied at $a_1$ and $a_2$ to the gate 15 are such as will produce the outputs given in the following table:

| Response: | Output |
|---|---|
| P | D.E. |
| Q | D.E |

The operation of this circuit is similar to that of the circuit of FIG. 1. The period of the centre frequency is controlled by the pulse duration of the first monostable 1, plus half the pulse duration of the second monostable 14, less half the pulse duration of the third monostable 20. The transitions are controlled by the third monostable 20.

Because this device is essentially a time discriminator, the limited band width does not cause a delay in the build-up or decay of the signal. It, therefore, has many applications where the delays caused by conventional filters are not acceptable.

The responses V and W of FIG. 3 can be considered as the rectified response of a low-pass and high-pass filter respectively but with the advantage that they do not "ring."

What is claimed is:

1. A frequency discriminator for generating from an input signal in the form of pulses an output signal dependent on the input frequency, said discriminator comprising:
    means for generating a train of reference pulses;
    means for generating from said input signal a square wave signal having a half period equal to the period of said input signal;
    means including said last-mentioned means for applying said input signal to said first mentioned means for controlling the generation of said reference pulses;
    and means including AND gates for combining said square wave signal with said reference pulses to derive said output signal, said output signal, at least over a range of pulse recurrence frequency, being substantially proportional to the difference between the recurrent period of said input pulses and the duration of said reference pulses.

2. A frequency discriminator according to claim 1, wherein said means for generating a square-wave signal comprises a binary counter, said discriminator comprising means for controlling said square-wave generating means by said input signal.

3. A frequency discriminator according to claim 1, wherein said reference pulse generating means comprises a monostable multivibrator.

4. A frequency discriminator according to claim 1, wherein said reference pulses are of constant duration.

5. A frequency discriminator according to claim 1, wherein the duration of said reference pulses varies only slowly in comparison with the maximum period of said input signal.

6. A discriminator according to claim 3, wherein said multivibrator is switched on by the leading edge of said input signal, the time for which said multivibrator remains switched on determining the centre frequency of said discriminator.

7. A discriminator according to claim 4, comprising a further monostable multivibrator which is switched on by the trailing edge of the output from the first-named multivibrator, said further multivibrator determining, by the time for which it remains switched on, the frequency range over which there is a linear relation between said input signal and said output voltage or current.

8. A discriminator accordnig to claim 3, for use with an input signal comprising two frequencies, the higher or lower of which has a fixed nominal value, wherein said multivibrator has a variable switch-on time, said discriminator comprising means for deriving a control voltage from said output voltage, means for applying said control voltage to said multivibrator to vary the switch-on time thereof, the said switch-on time following slow changes in value of one of said two frequencies, and means generating an output dependent on said one or the other of said input frequencies.

References Cited

UNITED STATES PATENTS

| 2,866,092 | 12/1958 | Raynsford | 328—109 X |
| 2,883,650 | 4/1959 | Brockway | 328—133 X |
| 3,226,577 | 12/1965 | Azuma et al. | 328—110 X |
| 3,207,995 | 9/1965 | Beer et al. | 328—133 |

ALFRED L. BRODY, *Primary Examiner.*

U.S. Cl. X.R.

178—5.4; 307—265; 328—109, 133; 329—104, 110